United States Patent [19]

Canutt

[11] Patent Number: 5,078,213

[45] Date of Patent: Jan. 7, 1992

[54] ADJUSTABLE FLOATING PUMPING SYSTEM

[76] Inventor: Forrest G. Canutt, 2681 Overlook Dr., Walnut Creek, Calif. 94598

[21] Appl. No.: 687,782

[22] Filed: Apr. 19, 1991

Related U.S. Application Data

[63] Continuation of Ser. No. 554,119, Jul. 13, 1990, abandoned, which is a continuation of Ser. No. 55,909, May 29, 1987, abandoned.

[51] Int. Cl.$^5$ .................. E21B 37/00; E21B 43/00
[52] U.S. Cl. .................. 166/369; 166/68.5; 166/105; 166/311; 210/242.3
[58] Field of Search ............. 166/369, 311, 380, 351, 166/54.1, 67, 68, 68.5, 69, 53, 102, 105; 417/61, 331, 337; 137/172; 405/59, 53; 210/242.1, 242.3, 923

[56] References Cited

U.S. PATENT DOCUMENTS

| | | | |
|---|---|---|---|
| 536,858 | 4/1895 | Donato | 210/242.1 |
| 593,885 | 11/1897 | Greer | 417/61 |
| 654,323 | 7/1900 | Price | 417/61 |
| 1,099,596 | 6/1914 | Gross | 417/61 X |
| 1,625,892 | 4/1927 | Hollander | 417/61 |
| 2,634,684 | 4/1953 | Alvarez et al. | 417/61 X |
| 2,933,051 | 4/1960 | Toulmin, Jr. | 417/61 X |
| 3,631,880 | 1/1972 | Hansel | 417/61 X |
| 3,757,813 | 9/1973 | Levenberg | 137/172 |
| 4,469,170 | 9/1984 | Farmer, Jr. | 166/53 |
| 4,663,037 | 5/1987 | Breslin | 210/242.3 X |

FOREIGN PATENT DOCUMENTS

| | | | |
|---|---|---|---|
| 210841 | 1/1956 | Australia | 137/172 |
| 1126208 | 3/1962 | Fed. Rep. of Germany | 137/172 |
| 2080107 | 11/1971 | France | 210/242.1 |
| 137486 | 7/1985 | Japan | 210/242.3 |
| 264979 | 11/1970 | U.S.S.R. | 405/53 |

Primary Examiner—Hoang C. Dang
Attorney, Agent, or Firm—James E. Eakin

[57] ABSTRACT

An adjustable floating pumping system is disclosed for recovery of petroleum products and other lighter than water contaminants from ground water through small diameter wells. The pumping system includes a novel arrangement of a float apparatus whereby a suction hose may be selectively positioned within the float for selective removal of contaminants. The invention results in an extremely cost-efficient method for recovery of petroleum contaminants.

12 Claims, 2 Drawing Sheets

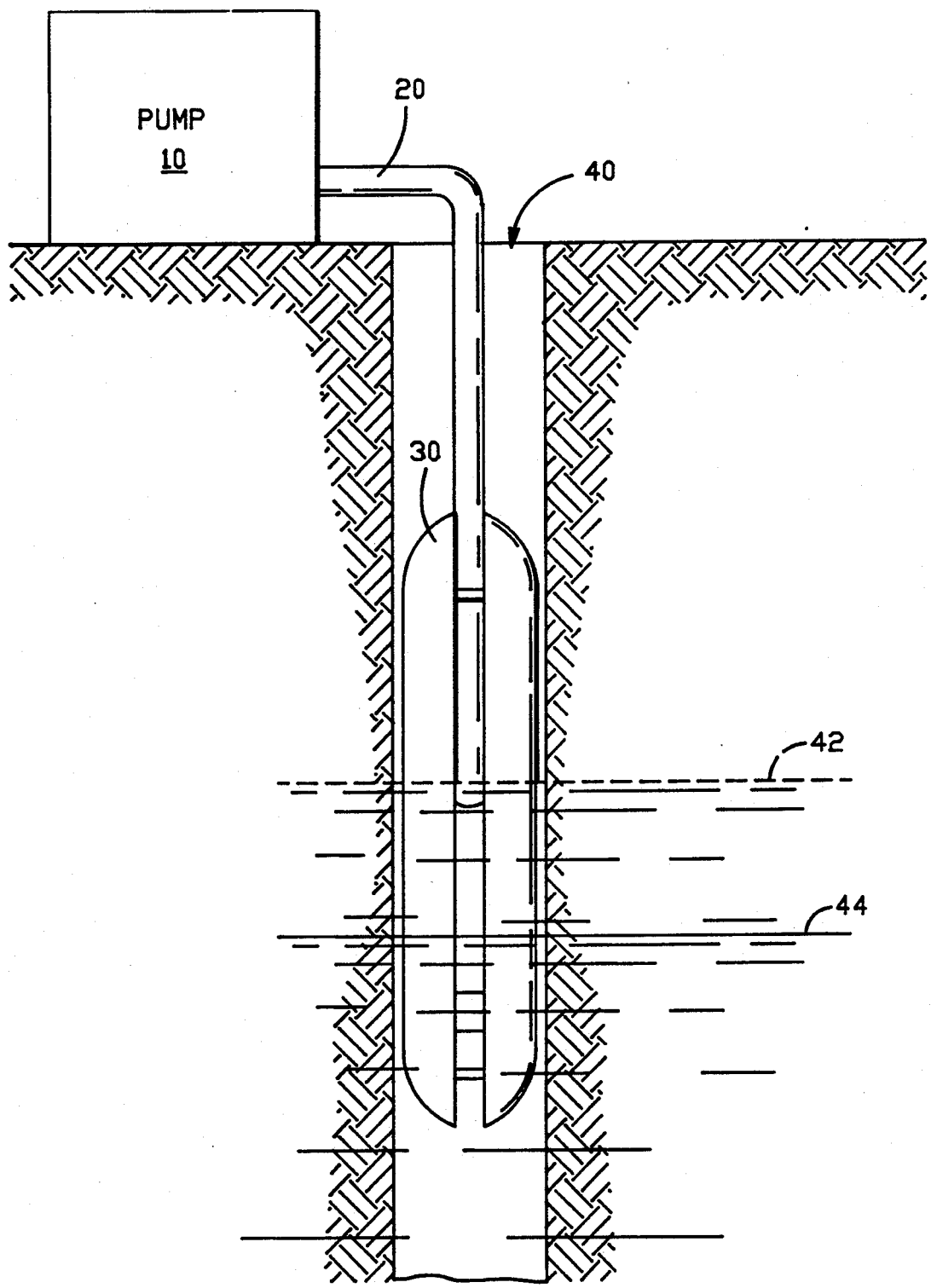
FIG.—1

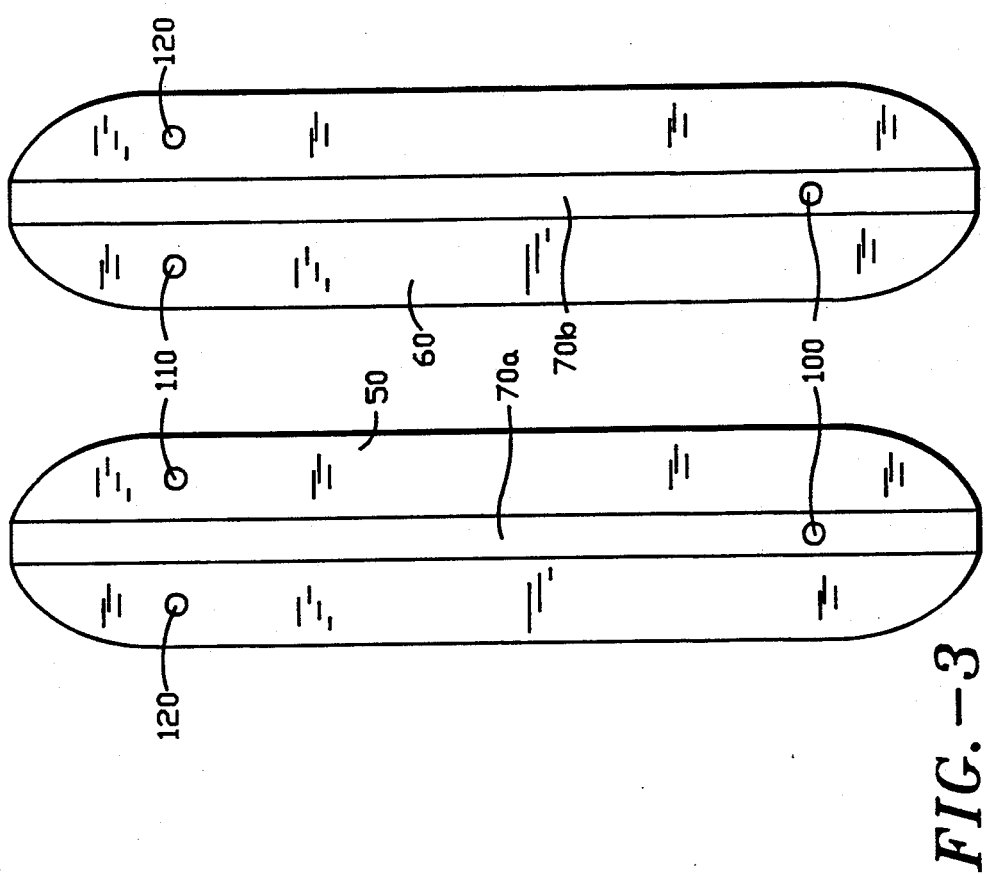
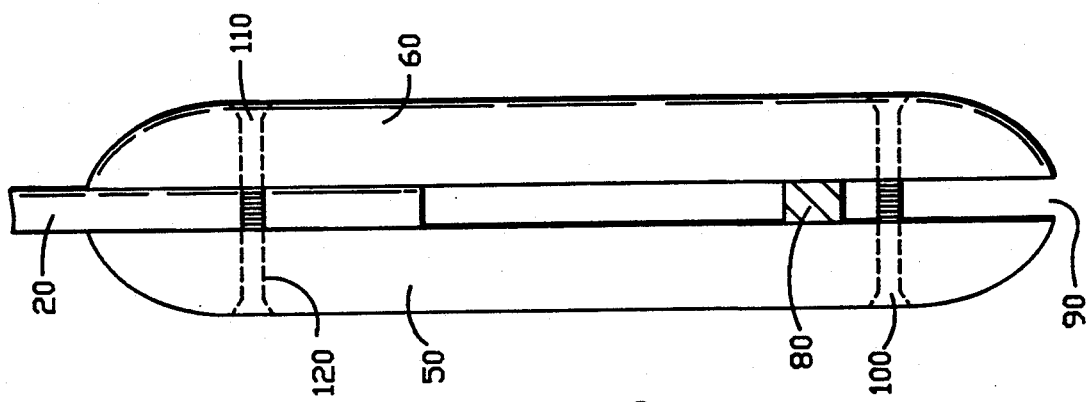

ADJUSTABLE FLOATING PUMPING SYSTEM

This application is a continuation, of application Ser. No. 554,119, filed 7/13/90, which is a continuation of application Ser. No. 055,909 filed 5/29/87, both abandoned.

FIELD OF THE INVENTION

The present invention relates to pump floats, and more particularly relates to adjustable pump floats for use in removing or sampling liquids.

BACKGROUND OF THE INVENTION

Recent discoveries of ground water pollution have necessitated the development of systems for eliminating the pollutants from the water table. Many such systems are extremely expensive, and can involve digging out the earth around the contaminated area, as well as other expensive procedures.

One particularly significant area of ground water pollution has been caused by leaking petroleum tanks petroleum deposits. In such contamination, the petroleum essentially floats on the surface of the water. In an effort to determine the existence or extent of such contamination of ground water, small wells on the order of two or four inches in diameter are frequently drilled in the area of suspected pollution. These wells, typically referred to as monitor wells, have historically been incapable of being used for recovery of the contaminants due to their small diameter.

One of the particular problems associated with such wells is that it is difficult to determine reliably and inexpensively the water level and the volume of contaminant. This in turn creates a difficulty in reliably removing the contaminant down to the water level.

Because of the widespread extent of petroleum contamination of ground water, both from leaking tanks and otherwise, there has been a need for a safe, inexpensive method of recovering the contaminant down to the surface of the water.

There has also been a need for a system for recovering ground water contaminants through monitor wells or other small access ports.

SUMMARY OF THE INVENTION

The present invention provides a solution to each of the foregoing problems for removing petroleum-based ground water contaminants, and in addition provides other additional desirable features.

The present invention comprises an adjustable float capable of being inserted into small diameter monitor wells. The float includes a port adapted to receive a suction hose, and a port in communication therewith to receive the liquid contaminant. A suitable pump is connected to the remaining end of the suction hose. The float is, in one embodiment, a pair of half cylinders connected to one another to clamp the suction hose therebetween. The flat sides of the two half cylinders may be grooved to permit a better fit of the cylinder halves to the suction hose.

The suction hose can be fastened into the cylinder halves at any desired point to remove contaminants. By proper selection of a float material and proper positioning of the hose within the cylinder, samples can be taken at or below the air-product interface, or at or below the product-water interface. The desired position of the hose within the float can be achieved by a simple trial and error process of positioning the hose within the space between the cylinder halves, and may be implemented by substantially unskilled workers. The elongated shape of the cylinder halves permits insertion of the float into monitor wells of varying sizes. The cylinder diameter may be sized to approximate the diameter of the monitor well to maintain the vertical orientation of the float within the monitor well, although precise vertical orientation is not required.

It is one object of the present invention to provide a reliable and inexpensive method and device for removing petroleum contaminants from ground water.

It is another object of the present invention to provide a method and apparatus for selectively sampling a liquid at a preselected level.

It is another object of the present invention to provide a method and apparatus for selectively removing contaminants from ground water through monitor wells.

These and other objects of the invention will be better appreciated from the following Detailed Description of the Invention, in which FIG. 1 schematically illustrates the recovery system of the present invention;

FIG. 2 illustrates an assembled float in accordance with the present invention; and FIG. 3 shows a disassembled view of the float of the present invention.

DETAILED DESCRIPTION OF THE INVENTION

Referring now to FIG. 1, the recovery system of the present invention can be appreciated. The system includes a pump 10 connected by a suction hose 20 to the float 30. The pump 10 is preferably a positive displacement pump, such as a peristaltic pump or other type of pump not requiring a prime. The suction hose 10 may be any suitable form of suction hose, such as polyethylene tubing.

As can be seen from FIG. 1, the float 30, described in greater detail in connection with FIGS. 2 and 3, is adjustably affixed to the suction hose 20 and then lowered into the well 40 or other access port. By selection of its flotation characteristics, the float 30 does not sink below the air-to-liquid interface 42. In conditions where contaminants such as petroleum products exist, a liquid-to-water interface 44 will also exist. By controlling the pumping rate and the position of the pump suction in the float, the operator is provided with numerous combinations for recovering petroleum product or other contaminants from the various types of soil and groundwater conditions that may be encountered.

When recovering petroleum product from ground water, the pump suction may preferably be positioned in the float 30 so that the suction is located just below the air to liquid interface. When pumping liquid using an optimum positioning of the suction hose within the float, a slight dip or depression on the ground water table is created in the area around the monitor well. This depression facilitates the gravitation of the petroleum product or other contaminant floating on the ground water table towards the monitor well and the pump suction.

As product accumulates in the monitor well, the float (and pump suction) rises into the petroleum product and pumps it off. As the petroleum product is pumped off, the pump suction returns to its original position relative to the air-liquid interface. The cycle intervals and quantity of petroleum product that will be removed from a monitor well depends on soil and ground water conditions and the quantity of petroleum product on the ground water.

In areas with substantial quantities of petroleum product, the product may be pumped continuously until the product yield diminishes. In areas of sparse contamination, more water than product will be pumped. If the operator wishes to reduce the amount of water pumped during recovery operations, the pump can be switched on and off for appropriate periods. The depression created during the on portion of the cycle will continue to permit accumulation of the product during the off portion of the cycle, and it can be readily pumped off when the pump is again switched on.

Referring now to FIGS. 2 and 3, the float 30 may be better appreciated. The float 30 preferably is formed of two half-cylinders 50 and 60, each of which preferably is rounded at the ends to insure that the float travels smoothly through the monitor well or other access.

The float halves 50 and 60 each preferably include a central groove 70a-b for receiving the suction hose 20, with the central groove preferably extending substantially the entire length of the float halves 50 and 60. Although not required for all applications, the groove 70a-b preferably is located substantially at the longitudinal axis of the float halves.

A spacer 80 may be included between the float halves 50 and 60 below the end of the suction tube 20. The spacer 80 is preferably sized to maintain the gap 90 between the assembled halves 50 and 60 at about the same distance as created by the suction hose 20. The spacer may be formed of any suitable material such as polyethylene, and may readily be located near the bottom of the float 30.

The float halves 50 and 60 may be fastened together to form the float assembly 30 by any suitable means which permits release of the halves for repositioning of the suction hose 20 therebetween without significantly impeding the travel of the float 30 through a monitor well having a diameter only slightly greater than the diameter of the float 30. Thus, countersunk nuts and bolts are an acceptable fastening means. A single bolt 100 may be used at the base of the float 30, whereas at the top of the float two bolts 110 and 120 have been found preferable for most applications.

The dimensions of the float 30 may vary with the size of the monitor well or access port into which the float will be inserted. Nevertheless, dimensions on the order of 12.5 inches long and 1⅝ inches in diameter have proven to be acceptable for two inch diameter monitor wells. The float 30 may be made from any of a wide variety of suitable materials, such as soft or hard woods, extruded and cast polymers, and other materials. A float constructed simply of redwood has proven acceptable both for flotation and durability. The features which have proven to be the most important in selecting a material for the float are its flotation characteristics and its durability. The selected material will preferably float with a portion of the float 30 above the air-liquid interface, and another portion below the interface, such that the float remains stable within the well while at the same time permitting a firm connection of the hose to the float at locations both above and below the air-liquid interface.

With the foregoing description of the float 30 in mind, the method of the present invention for recovering petroleum or other non-water soluble contaminants can be better appreciated. Referring again to FIG. 1, with the float 30 made of a suitable material such that the float rides partially above and partially below the air-liquid interface, the hose 20 is inserted into the top of the float 30. The hose 20 may be positioned at any selected location above or below the air liquid interface. For recovering petroleum products, the hose will preferably be positioned slightly below the air-liquid interface, and actuation of the pump will cause the petroleum products to be removed from the well through the suction hose 20. The air-liquid interface will vary for differing types of materials, and may be determined empirically for each specific material. When the petroleum or other contaminants are fully recovered, a slight amount of water will be removed, at which time the pump may be shut off.

If it is desired to sample, rather than recover, fluids, the hose may be positioned at a different location within the float. This will permit sampling of different strata of fluids, in addition to full recovery.

Having fully described one embodiment of the invention, it will be appreciated by those skilled in the art, given the teachings herein, that numerous alternatives and equivalents exist which do not depart from the invention. It is therefore to be understood that the invention is not to be limited by the foregoing description, but only by the appended claims.

What is claimed is:

1. A method for recovering liquid contaminants having a different density than water from ground water involving the steps of providing a float means comprising two separate segments, providing a suction hose having a first end and a second end, releasably securing said two segments and the first end of the suction hose sandwiched therebetween together, such that the first end of the suction hose, when deposited into an access port having contact with water and a liquid contaminant contacts a preselected level of either water, water and liquid contaminants, or liquid contaminants, inserting the float means and suction hose clamped therein into the preselected level through the access port, connecting the second end of the suction hose to a positive displacement pump, the positive displacement pump being outside the access port, and recovering the liquid at the preselected level.

2. A contaminant recovery system for recovering ground water contaminants which reside above a water table, thereby creating a liquid contaminant-water interface, through a monitor well or other small hole in the ground comprising a suction hose having two ends, a positive displacement pumping means positioned outside the monitor well or other small hole in the ground and connected to one end of the suction hose, and a float means comprising two separate segments, the other end of the suction hose sandwiched between said segments, and means for releasably securing said segments and the other end of said suction hose together, the float means being adjustably connected to the other end of the suction hose for maintaining the other end of the suction hose in a predetermined fixed position relative to the liquid contaminant-water interface in the monitor well or other small hole in the ground, the float means having a receiving means for receiving the suction hose in the upper portion thereof and further having a gap extending between the location of the other end of the suction hose and the liquid contaminants by which such liquid contaminants are maintained in fluid communication with the other end of the suction hose until such liquid contaminants are recovered.

3. A method of selectively recovering liquids of different densities through a monitor well or other small hole in the ground involving the steps of providing a positive displacement pump external to the monitor well or other small hole in the ground, providing a float means comprising two separate segments, connecting one end of a suction hose to the positive displacement pump, positioning the lower end of the suction hose between the two segments of the float means, and releasably securing said two segments and the lower end of the suction hose sandwiched therebetween together at a predetermined, adjustable height relative to the interface between a first medium and a second medium within the well, inserting the flotation device into the media through the monitor well or other small hole in the ground, and operating the pump to recover at least one of the media.

4. The invention of claim 3 wherein the first medium is water and the second medium is lighter than water.

5. The invention of claim 3 wherein the first medium is air and the second medium is liquid contaminant lighter than water.

6. The invention of claim 3 wherein the first medium is a first liquid and the second medium media is a second liquid having a density different than the first liquid.

7. A contaminant recovery system for recovering a selected one of at least two media of different densities through a monitor well or other small hole in the ground comprising a positive displacement pumping means positioned outside the monitor well or other small hole in the ground, a suction hose having first and second ends, the first end being connected to the pumping means, and a float means sized to have a cross-sectional area sufficiently smaller than the cross-sectional area of the well or other small hole in the ground so as to permit free vertical movement within the well, but sufficiently comparable to the cross-sectional area of the well or other small hole in the ground so as to maintain the float means in a vertical orientation, the float means comprising two separate segments, the lower end of the suction hose sandwiched between said segments, and means for releasably securing said segments and the lower end of said suction hose together, the float means including means for adjustably maintaining the second end of the suction hose within the float means at a predetermined height relative to the interface between the first medium and the second medium in the well or other small hole in the ground, and gap means for maintaining fluid communication between the second end of the suction hose and a selected one of the media until the selected medium has been fully recovered.

8. The invention of claim 7 wherein the first medium is a first liquid and the second medium is a second liquid having a density different than the first liquid.

9. The invention of claim 7 wherein the first medium is air and the second medium is liquid.

10. The invention of claim 7 wherein the first medium is water and the second medium is a liquid having a density different than water.

11. The invention of claim 7 wherein the float means is formed in two parts and the gap means is created at the interface between the two parts.

12. The invention of claim 11 wherein the float means is formed in two substantially half cylinders along a vertical axis.

* * * * *